United States Patent [19]

Ichikawa et al.

[11] Patent Number: 5,688,561
[45] Date of Patent: Nov. 18, 1997

[54] COATING METHOD

[75] Inventors: Yoshio Ichikawa, Yokohama; Yoshio Niho; Kiyoharu Suzuki, both of Kanagawa, all of Japan

[73] Assignee: Kabushiki Kaisha Nippankenkyusho, Kanagawa, Japan

[21] Appl. No.: 633,209

[22] Filed: Apr. 16, 1996

[51] Int. Cl.$^6$ .................................................. B05D 3/02
[52] U.S. Cl. ............................ 427/376.2; 427/376.4; 427/376.6; 427/380; 427/397.7
[58] Field of Search .................... 427/376.2, 376.4, 427/376.6, 380, 397.7

[56] References Cited

U.S. PATENT DOCUMENTS

| | | | |
|---|---|---|---|
| 3,908,966 | 9/1975 | Parkinson | 428/379 |
| 4,035,265 | 7/1977 | Saunders | 252/510 |
| 4,189,414 | 2/1980 | Kikuchi et al. | 260/29.4 R |
| 4,294,874 | 10/1981 | Home | 427/393 |
| 4,507,360 | 3/1985 | Perferri | 428/336 |
| 4,550,032 | 10/1985 | Compen et al. | 427/64 |

*Primary Examiner*—Benjamin Utech
*Attorney, Agent, or Firm*—Birch, Stewart, Kolasch & Birch, LLP

[57] ABSTRACT

A substrate is coated with a coating composition (1) mainly composed of 3 to 16 parts by weight (in terms of an $SiO_2$ basis) of a quaternary ammonium silicate (a), 15 to 85 parts by weight of an inorganic filler (b) and 12 to 82 parts by weight of water (c) (with the proviso that (a)+(b)+(c)=100 parts by weight), further with a coating composition (2) mainly composed of 2 to 15 parts by weight (in terms of $SiO_2$) of a quaternary ammonium silicate (a)' and 98 to 85 parts by weight of water (c)' (with the proviso that (a)'+(c)'=100 parts by weight) as required, followed by hardening by drying at an ordinary temperature or by heat drying at a low temperature, thereby obtaining a noncombustible, weatherproof film.

4 Claims, No Drawings

COATING METHOD

BACKGROUND OF THE INVENTION

The present invention relates to a coating method, and more particularly to a coating method of applying specified coating compositions to surfaces of concrete, cement, calcium silicate or other ceramic substrates, or surfaces of iron, aluminum, stainless steel or other metallic materials, or surfaces of glass, paper or wood materials, and drying and hardening the compositions at ordinary temperatures or by heating at low temperatures to obtain noncombustible, weatherproof films high in hardness and density, further excellent in soil resistance, water and hot water resistance, heat resistance, wear resistance and chemical resistance, particularly in alkali resistance and organic solvent resistance, and good in decorating properties.

In order to improve the heat resistance, weather resistance, chemical resistance, water repellency, hot water resistance, wear resistance, etc. of surfaces of substrates, various coating methods for forming films, various coating compositions and noncombustible films have previously been proposed. For example, silicone resin compositions, organoalkoxysilane compositions, silane zirconium compositions, fluororesin compositions and sodium silicate-potassium-lithium films are disclosed.

However, the silicone resin compositions are low in hardness even if they are sufficiently heat treated, and are insufficient in weather resistance, soil resistance and wear resistance. The organoalkoxysilane compositions are insufficient in alkali resistance and boiling water resistance when they are heat treated at low temperatures. Further, the silane zirconium compositions require heat treatment, are low in hardness, and insufficient in workability. Furthermore, the fluororesin compositions have the problems that they are low in hardness, and are liable to be harmed and to generate static charges. In addition, the sodium silicate-potassium-lithium films are poor in water and hot water resistance.

As described above, the conventional coating compositions and films do not provide films which are noncombustible, have weather resistance for 30 years or more, are high in hardness and excellent in water and hot water resistance, alkali resistance, acid resistance and soil resistance.

SUMMARY OF THE INVENTION

An object of the present invention is to provide a noncombustible, weatherproof film having the following features and applicable to various uses with which no film has previously complied.

(1) The Composition can be dried and hardened at ordinary temperatures or by heating at low temperatures (30° to 250° C.);

(2) The film is noncombustible, keeps high weather resistance for 30 years, and withstands temperatures of 1,000° C. or more;

(3) The film is high in hardness, and excellent in soil resistance and wear resistance;

(4) The film is excellent in water resistance, hot water resistance, alkali resistance, acid resistance and organic chemical resistance;

(5) The film is good in decorative properties, and can also form a thick film or a semi-gloss decorative film;

(6) The film can be used as a functional film such as a rust and corrosion preventing film, a heat insulating film, a heat radiating film, an electric conductive film, a deodorizing film and a mold preventing film; and (7) The composition is an aqueous composition containing no harmful substance and good in workability.

According to the present invention, there is provided a coating method comprising applying a coating composition (1) mainly composed of 3 to 16 parts by weight (in terms of an $SiO_2$ basis) of a quaternary ammonium silicate (a), 15 to 85 parts by weight of an inorganic filler (b) and 12 to 82 parts by weight of water (c) (with the proviso that (a)+(b)+(c)=100 parts by weight) to a surface of a substrate, further applying thereto a coating composition (2) mainly composed of 2 to 15 parts by weight (in terms of $SiO_2$) of a quaternary ammonium silicate (a)' and 98 to 85 parts by weight of water (c)' (with the proviso that (a)'+(c)'=100 parts by weight) as required, and hardening the applied composition(s) by drying at an ordinary temperature or by heat drying at a low temperature.

DESCRIPTION OF THE PREFERRED EMBODIMENTS

The present invention will hereinafter be described in the order of compositions (1) and (2) used in the present invention, substrates and coating methods.

Coating Composition (1)

The coating composition (1) acts so as to increase the thickness of a film obtained, to provide a noncombustible, weatherproof film high in hardness and excellent in wear resistance, water resistance, hot water resistance, alkali resistance, acid resistance, organic chemical resistance and soil resistance, and further to give it functions such as rust and corrosion prevention, heat insulation, heat radiation, electric conductivity, deodorization and mold prevention. The composition (1) is mainly composed of a quaternary ammonium silicate (a), an inorganic filler (b) and water (c).

(a) Quaternary Ammonium Silicate

In the present invention, the quaternary ammonium silicate (a) forms a thin film of $SiO_2$ on dehydration and drying at ordinary temperatures or by heating at low temperatures to act as a binder. However, the quaternary ammonium silicate (a) alone forms a film only having a thickness of about 0.1 μm to about 0.4 μm on a smooth surface of the substrate, because the component (a) is generally used in the aqueous silica sol form. Such a film is almost of no use. When the component (a) is combined with the filler of the component (b), the quaternary ammonium silicate forming the aqueous silica sol reacts with functional groups such as hydroxyl groups on a surface of the filler having a large surface area in the grain or fiber form to be strongly bound thereto, thereby forming a film good in adhesion, hardenable at ordinary temperatures or by heating at low temperatures, noncombustible, high in weather resistance, heat resistance and hardness, and having wear resistance, hot water resistance, alkali resistance, acid resistance and organic chemical resistance.

The component (a) is represented, for example, by general formula $(R_4N)_2O \cdot nSiO_2$ (wherein R represents a monovalent organic group, and n is a natural number), but is not limited thereto.

Alkali metals are little contained in the component (a), so that an $SiO_2$ film of high purity is obtained on removal of organic substances by heating.

There is no particular limitation on the component (a), as long as it is a quaternary ammonium silicate. For example, the component (a) can be prepared by the following method.

That is, a quaternary ammonium salt (for example, a cationic surface active agent comprising the quaternary ammonium salt) is added in an amount of 0.1 to 2% by weight based on $SiO_2$ to a silica sol having a pH of 4 or less in which the molar ratio of $SiO_2:M_2O$ (wherein M represents an alkali metal) or $NH_3$ is 300 or less and anions are little contained. After sufficient mixing, an alkaline substance is added to adjust the pH of the silica sol, and heating is further performed at a temperature of 60° C. or more for 1 hour or more as required, thereby obtaining (a) the quaternary ammonium silicate as a stable silica sol to which the quaternary ammonium salt is bound.

If the molar ratio of $SiO_2:M_2$ or $NH_3$ is less than 300, surfaces of silica grains are covered with a large amount of the alkali metal or $NH_3$. This is therefore liable to cause inhibition of direct bonding of the quaternary ammonium salt to the silica grains. In order to bond the quaternary ammonium salt to the silica grains strongly, it is necessary to add the quaternary ammonium salt to the silica sol having a pH of 4 or less which scarcely contains alkali metal ions and other cations.

For example, a cationic surface active agent such as an alkylamine salt, an alkylpicolinium halide, polyoxyethylene, an alkylamine, an alkylamidomethylpyridinium chloride, an alkylpyridinium chloride or an alkyldimethylbenzylammonium chloride can also be used in place of the above-mentioned quaternary ammonium salt or in combination therewith.

The quaternary ammonium salt or the cationic surface active agent is required to be completely dissolved in water or hot water to add it to the silica sol as a transparent solution. Furthermore, sufficient mixing by stirring is necessary.

The quaternary ammonium salt or the cationic surface active agent is added in an amount of 0.1 to 2% by weight based on $SiO_2$. Being less than 0.1% by weight results in unstableness of silica sol, whereas exceeding 2% by weight results in the possibility of gelation.

An alkaline substance such as ammonium hydroxide, morpholine or triethanolamine is added to the silica sol thus treated to adjust the system to pH 8 or more. The sol state of the silica sol thus obtained is maintained at ordinary temperatures for about 30 days to about 60 days. When the permanent stability is required for the silica sol, it is preferred that the silica sol is aged at 60° C. or The amount of the component (a) in the coating composition (1) of the present invention is 3 to 16 parts by weight in terms of an $SiO_2$ basis, and preferably 5 to 10 parts by weight. Being less than 3 parts by weight results in lack of bonding strength or in powdering, whereas exceeding 16 parts by weight causes failure of film formation or development of cracks.

(b) Inorganic Filler

As the inorganic filler (b) used in the coating composition (1) of the present invention, a filler having a mean grain size or a mean length of 0.1 µm to 100 µm, more preferably 0.3 µm to 50 µm, is used. If the mean grain size is less than 0.1 µm, the functions of the inorganic filler can not be exhibited, or the production cost excessively rises. On the other hand, if the mean grain size exceeds 100 µm, a surface of the film is roughened, or the adhesion is reduced.

Such inorganic fillers are preferably water-insoluble grain-like or fiber-like fillers, and include inorganic extender pigments, functional pigments, inorganic pigments and metal powders. One or more kinds of fillers selected from the group consisting of these pigments and powders are used.

Specific examples of the inorganic extender pigments and the functional pigments include commercially available silica, alumina, kaolin, zircon, tin oxide, mullite, zeolite, talc, perlite, carbon, silicon carbide and silicon nitride. The inorganic pigments include commercially available oxides of titanium, iron, manganese, cobalt, chromium, nickel, etc., synthetic oxides of two kinds of elements such as cobalt and aluminum, and iron and manganese, and synthetic oxides of three kinds of elements such as iron, copper and manganese. They further include but are not limited to powders of metals such as zinc, nickel, stainless steel, aluminum and tin, zeolite subjected to antibacterial treatment, and silica gel.

Such a filler is added in an amount of 15 to 85 parts by weight, preferably 30 to 70 parts by weight, to the coating composition (1). Being less than 15 parts by weight results in failure of expression of the functions of the inorganic filler, whereas exceeding 85 parts by weight unfavorably leads to a decrease in adhesion or in hardness, or an increase in viscosity, or lack of the component (a) or the component (c).

Such fillers are necessary for forming thick films, and further color the films and give the films various functions such as heat radiation, ultraviolet absorption, heat insulation, electric conductivity, rust prevention, antibacterial properties and deodorization.

(c) Water

Water (c) used in the coating composition (1) of the present invention is a component indispensable for viscosity adjustment of the composition, control of usable time and dispersion of the inorganic filler. Water which can be used include tap water, distilled water and ion-exchanged water. Water contained in the aqueous silica sol comprising the quaternary ammonium silicate, the component (a), is also included.

Water (c) is added in an amount of 12 to 82 parts by weight, preferably 20 to 50 parts by weight, to the coating composition (1). Being less than 12 parts by weight causes an increase in viscosity or poor dispersion of the inorganic filler, whereas exceeding 82 parts by weight unfavorably results in formation of the film too thin in thickness.

The coating composition (1) of the present invention can contain at least one of various surface active agents, dispersing agents, hardening regulators, dyes, colloidal or ultrafine-grained silica and alumina, synthetic resins soluble or dispersible in water or hydrophilic organic solvents such as alcohols, for example, acrylic resins, urethane resins, alkyd resins, phenol resins, melamine resins, epoxy resins and polybutadiene rubber, and other additives, in addition to the above-mentioned components (a) to (c), if necessary.

The coating composition (1) of the present invention is prepared by adding the component (b) to the component (a), and further adding water (c) thereto as required when the amount of water contained in the component (a) is insufficient to adjust the total solid content preferably to 15 to 85% by weight, and more preferably to 30 to 75% by weight.

In this case, the coating composition (1) can be dispersed in a roll mill, a ball mill or another dispersing device, and filtered to form an uniform, stable dispersion.

Coating Composition (2)

The coating composition (2) acts so as to give functions such as semi-gloss decorative properties, improved soil resistance and high hardness to the film to be obtained. The coating composition (2) is mainly composed of a quaternary ammonium silicate (a)' and water (c)'.

The quaternary ammonium silicate (a)' and water (c)' used in the coating composition (2) are each the same as the components (a) and (c) used in the above-mentioned coating composition (1).

The amount of the component (a)' used in the coating composition (2) is 2 to 15 parts by weight, and preferably 3.5 to 7.5 parts by weight. If the amount is less than 2 parts by weight, the film formed of the coating composition (2) is too thin, or the amount of the coating composition (2) impregnated in the film formed of the coating composition (1) (hereinafter referred to as an "undercoat film") is too small to cover the undercoat film or to obtain sufficient hardness. On the other hand, exceeding 15 parts by weight unfavorably results in development of cracks or in powdering.

The component (c)' (water) is used in an amount of 98 to 85 parts by weight, preferably 96.5 to 92.5 parts by weight. If the amount of water exceeds 98 parts by weight, the amount of the component (c)' becomes relatively too small to obtain the effects of the present invention. On the other hand, being less than 85 parts by weight unfavorably results in an excessively increased amount of the component (a)'.

The coating composition (2) of the present invention can contain at least one of various surface active agents, dispersing agents, hardening regulators, dyes, colloidal or ultrafine-grained silica and alumina, and other additives, in addition to the above-mentioned components (a)' and (c)', if necessary, as is the case with the coating composition (1).

The coating composition (2) of the present invention is prepared from the component (a)' alone, or by further adding water (c)' thereto as required when the amount of water contained in the component (a)' is insufficient.

In this case, the coating composition (2) can be dispersed with a high-speed agitator or another dispersing device to form an uniform, stable dispersion.

Substrate

Substrates to be coated in the present invention include substrates of metals such as iron, stainless steel and aluminum, substrates of inorganic materials such as cement, concrete, glass and ceramics, and substrates of organic materials such as paper and wood.

Coating Method

Coating processes such as brush coating, spray coating, dipping, roll coating and printing can be used for coating the substrate with the coating compositions (1) and (2).

When the substrate is coated (hereinafter also referred to as "undercoated") with the coating composition (1), the coating composition (1) is applied in an amount of 20 to 400 g, preferably in an amount of 40 to 200 g per m² for every coating in terms of solid content. Although this coating can be repeated several times, the total amount coated is usually 20 to 400 g per m², and preferably 40 to 200 g per m² in terms of solid content.

The dry thickness of the undercoat film is usually 10 μm to 200 μm, and preferably 20 μm to 100 μm.

After coating of the coating composition (1), the composition (1) can be easily hardened at ordinary temperatures (5° to 30° C.) for 1 to 8 hours, or by heating at low temperatures (higher than 30° C. to 250° C., preferably 50° to 150° C.) for 5 to 40 minutes to obtain the film.

When the coating composition (2) is further applied (hereinafter also referred to as "overcoated") onto the undercoat film as required, the coating composition (2) is applied in an amount of 2 to 15 g, preferably in an amount of 3 to 10 g per m² for every coating in terms of solid content. Although this overcoating can be repeated several times, the total amount coated is usually 2 to 20 g per m₂ and preferably 3 to 10 g per m² in terms of solid content.

The overcoat film is formed by coating the undercoat film with the coating composition (2) to impregnate the undercoat film with the composition (2). It is therefore difficult to determine the dry thickness of the overcoat film.

After coating of the coating composition (2), the composition (2) can be easily hardened at ordinary temperatures (5° to 30° C.) for 1 to 8 hours, or by heating at low temperatures (higher than 30° C. to 250° C., preferably 50° to 150° C.) for 5 to 40 minutes to obtain the film.

When the coating composition (2) is overcoated, after coating of the substrate with the coating composition (1), the coating composition (2) can be subsequently applied thereto, and the compositions (1) and (2) can be hardened by drying at ordinary temperatures or heating at low temperatures.

In the present invention, the coating composition (1) containing the inorganic filler is used, so that the thickness of the film can be increased by overlap coating. Accordingly, a corrosion preventing film, a heat insulating film, a dew condensation preventing film, a deodorizing film or a smoothing film can be prepared.

Further, the film obtained using the coating composition (1) of the present invention is good in adhesion, noncombustible, and high in hardness and density. In addition, the film is excellent in heat resistance, weather resistance, water resistance, chemical resistance, damage resistance, impact resistance and wear resistance, and can be used for various applications. For example, the film can be used for wide applications such as a weatherproof, corrosion preventing decorative film, a noncombustible, heat radiating decorative film and a heat deterioration preventing film for metals, a weatherproof, chemical-resistant decorative film for cement construction materials, and a weatherproof, flameproof film and a heat absorbing film on the outside of a cooking device for wood and paper.

Further, the coating composition (2) of the present invention is transparent or semi-transparent, smoothens the surface of the undercoat film, has improved hardness, is excellent in soil resistance, gives a semi-gloss beautiful decorative film, and can keep the appearance for a long period of time.

As described above, according to the present invention, the noncombustible, weatherproof film having the following features and applicable to various applications with which no film has previously complied.

(1) The composition is dried and hardened at ordinary temperatures or by heating at low temperatures (30° to 250° C.);

(2) The film is noncombustible, keeps high weather resistance for 30 years, and withstands temperatures of 1,000° C. or more;

(3) The film is high in hardness, and excellent in soil resistance and wear resistance;

(4) The film is excellent in water resistance, hot water resistance, alkali resistance, acid resistance and organic chemical resistance;

(5) The film is good in decorative properties, and can form a thick film or a semi-gloss decorative film;

(6) The film can be used as a functional film such as a rust and corrosion preventing film, a heat insulating film, a heat radiating film, an electric conductive film, a deodorizing film, a mold preventing film, a non-slip film and a hardened film; and (7) The composition is an aqueous composition containing no harmful substance and good in workability.

The resulting noncombustible, weatherproof film can be used for wide applications such as a weatherproof, hard, soil-resistant, corrosion preventing decorative film, a noncombustible, heat radiating decorative film and a heat-resistant, corrosion preventing film for metals, a weatherproof, alkali-resistant, soil-resistant, protective decorative film for cement construction materials, and a flameproof film and a heat deterioration preventing, soil-resistant, heat absorbing film on the outside of a cooking device for wood and paper.

Specifically, when the film obtained by the present invention is used for metal or cement construction materials (materials for inner walls or outer walls, outdoor structures, etc.), a noncombustible film high in hardness and excellent in weather resistance, soil resistance, hot water resistance and chemical resistance can be obtained by drying at ordinary temperatures or about 100° C. for a short period of time. Further, when the film is used for inner and outer surfaces of heating furnaces, outer surfaces of cooking devices, etc., a film continuously withstanding the use thereof at 1,000° C. or more and excellent in damage resistance, heat deterioration prevention, heat radiation and soil resistance can be obtained.

As described above, the film obtained according to the present invention can be used for various applications with which no film has previously complied.

The present invention is described with reference to the following examples in more detail. However, it is to be understood that the invention is not limited to the following examples.

Unless otherwise indicated, parts and percentages are by weight in the examples.

In the examples, evaluation tests were conducted as follows:

Adhesion

On a coating of a test piece, 11 vertical parallel lines and 11 horizontal parallel lines were cut at 1-mm intervals so as to cross at right angles to form 100 cross-cut squares per $cm^2$. Then, a cellophane tape was adhered thereto. When the tape was peeled therefrom, the separation degree of the coating was evaluated as 100/100 (no separation) to 0/100 (all were separated).

Hardness

A coating of a test piece was scratched with pencils, and the upper limit of the hardness of a pencil which did not harm the coating was taken as the hardness of the coating. For example, a coating hardness of 5H means that a pencil having a hardness of 5H does not harm a coating, but a pencil having a hardness of 6H harms the coating.

Impact Resistance

A steel ball having a radius of ½ inch and a weight of 500 g was dropped from a height of 20 cm on a test piece, and the degree of damage of the test piece was evaluated.

Heat Resistance

A test piece was kept in an electric furnace at 600° C. for 5 hours, and thereafter subjected to furnace cooling. Then, the appearance of a film was observed.

Incombustibility

A test piece was exposed to a flame of town gas, and then, the appearance of a film was observed.

Weather Resistance (1)

A test piece was exposed for 8,000 hours by use of a sunshine carbon arc lamp weather meter under the following irradiation conditions:

Input voltage: 200±20 V AC

Arc voltage: 135 V

Arc current: 16 A

Black panel temperature: 63° C.±3° C.

Number of revolutions: about 1 rpm

Spray water pressure: 0.8–1.2 kgf/$cm^2$

Amount of spray water: 2.10±0.1 liter/minute (the total of water sprayed from 4 nozzles Spray time: every 18 minutes for 120 minutes at the same intervals Irradiation time: 40 hours per cycle Then, the appearance of a film was observed.

Weather Resistance (2)

After the QUV test [repeated test of UV irradiation (70° C./8 hours) and dew condensation (50° C./4 hours)] for 8,000 hours, the appearance of a film was observed.

Hot Water Resistance

A test piece was kept in hot water at 60° C. for 30 days. Then, the appearance of a film was observed.

Boiling Water Resistance

A test piece was kept in boiling water for 8 hours, and thereafter allowed to cool. This procedure was repeated 10 times. Then, the appearance of a film was observed.

Thermal Cycle

A test piece was kept in an electric furnace at 500° C. for 30 minutes, and thereafter subjected to furnace cooling. This procedure was repeated 10 times. Then, the appearance of a film was observed.

Salt Water Spray Resistance

A 4% saline solution was continuously sprayed to a test piece for 960 hours. Then, the appearance of a film was observed.

Alkali Resistance

A test piece was immersed in a 5% aqueous solution of sodium hydroxide and kept for 72 hours. Then, the appearance of a film was observed.

Acid Resistance

A 20% aqueous solution of hydrochloric acid was dropped to a test piece, which was kept for 8 hours. Then, the appearance of a film was observed.

Solvent Resistance

A test piece was immersed in a mixed solvent of acetone/cellosolve/ethyl acetate/industrial hydrous alcohol/toluene= 3/2/2/1/2 (weight ratio) for 10 days. Then, the appearance of a film was observed.

Wear Resistance

A test piece was strongly rubbed with steel wool of #0000. Then, the appearance of a film was observed, and the presence or absence of scratches on the film was judged.

Results obtained by the above-mentioned observation of the appearance of the film were evaluated according to the following standard:

○: No film separation was observed, and no change was also observed in the appearance.

x: Separations, cracks or flaws caused by dissolution were observed in a part or all of the film.

—: Not evaluated.

Soil Resistance (1)

A test piece was soiled with red oil based ink and black oil based ink. Then, the ink was swabbed with waste impregnated with a solvent (methanol), and the presence or absence of traces was observed.

Soil Resistance (2)

A test piece was coated with a 0.1% aqueous dispersion of carbon black, and heated at 60° C. for 1 hour. Then, carbon black was swabbed with waste, and the presence or absence of traces was observed.

For soil resistance (1) and soil resistance (2), the test piece on which no trace was observed is evaluated as ○, and the test piece on a part or all of which traces were observed was evaluated as x.

Permeability

A funnel was turned upside down on a coating of a test piece and filled with ion-exchanged water. After 72 hours, the permeability P (g/$cm^2$·hour) was determined by the following equation:

$$P = a \cdot h/72A \, (g/cm^2 \cdot hour)$$

wherein an area of the coating in contact with water was taken as A ($cm^2$), a cross-sectional area of a thin tube at a bottom of the funnel was taken as a ($cm^2$), and a moved distance of water in the thin tube after 72 hours was taken as h (cm).

EXAMPLES 1 to 7

Seven kinds of coating compositions (1), A to G, shown in Table 1 were prepared.

Each of the above-mentioned coating compositions was prepared by placing components (a) and (b), further component (c) and/or other additives if necessary in a mixing tank, and lightly stirring the mixture, followed by stirring at a high speed (13,000 rpm) for 30 minutes and filtering through a 50- to 100-mesh filter.

The respective components shown in Tables are as follows:

Component (a)

(a)-1; Amine Silicate NS-40 ($SiO_2$ concentration=about 40%), manufactured by Kabushiki-Kaisha Nippan Kenkyujo (Japan)

(a)-2; Amine Silicate NS-25 ($SiO_2$ concentration=about 25%), manufactured by Kabushiki-Kaisha Nippan Kenkyujo (Japan)

Inorganic Filler (b)

(b)-1; Silicon dioxide (mean grain size=2 to 3 μm)

(b)-2; Silicon dioxide (mean grain size=30 to 40 μm)

(b)-3; Zirconium silicate (zircon, mean grain size=1 to 2 μm)

(b)-4; Aluminum oxide (mean grain size=0.8 μm)

(b)-5; Titanium oxide white (mean grain size=0.5 μm)

(b)-6; Synthetic oxide (iron-manganese-copper) black (mean grain size=0.5 μm)

(b)-7; Iron oxide yellow (mean grain size=0.6 μm)

(b)-8; Flaky stainless steel (mean length=5 μm)

(b)-9; Zinc powder (mean grain size=5 μm)

Water (c)

(c)-1; Ion-exchanged water

Another Additive (d)-1; Dispersing agent (nonionic surface active agent)

TABLE 1

| | Example | | | | | | |
|---|---|---|---|---|---|---|---|
| | 1 | 2 | 3 | 4 | 5 | 6 | 7 |
| Kind of Composition (1) | A | B | C | D | E | F | G |
| Formulation (parts) | | | | | | | |
| (a)-1 | — | 20 | — | — | — | 10 | — |
| (a)-2 | 27 | — | 35 | 25 | 20 | — | 70 |
| (b)-1 | 15 | 10 | — | — | — | — | — |
| (b)-2 | — | — | — | — | — | 60 | — |
| (b)-3 | 20 | — | 20 | — | — | — | — |
| (b)-4 | — | 20 | 20 | — | — | 20 | 15 |
| (b)-5 | 25 | 30 | 10 | — | — | — | 15 |
| (b)-6 | — | 8 | — | — | — | — | — |
| (b)-7 | — | — | 5 | — | — | — | — |
| (b)-8 | — | — | — | 75 | — | — | — |
| (b)-9 | — | — | — | — | 80 | — | — |
| (c)-1 | 13 | 12 | 10 | — | — | 10 | — |
| Total (parts) | 100 | 100 | 100 | 100 | 100 | 100 | 100 |
| (d)-1 | 0.5 | — | 0.5 | — | — | 0.5 | — |

Preparation of Test Pieces for Evaluation

Various substrates shown in Table 2 were coated with the coating compositions (1) thus prepared, followed by hardening to prepare test pieces for evaluation (Nos. 1 to 21). Of these substrates, steel plates, aluminum plates and stainless steel plates were subjected to alkali degreasing treatment, and the other plates are subjected to cleaning treatment as substrate treatment before coating of the coating compositions. An air spray gun was used for coating of the coating compositions, and an electric oven was used for heating. The number of coatings of the coating compositions and hardening conditions are shown in Tables 3 to 5.

TABLE 2

| Test Piece | Material | Size (mm) | Pieces Prepared |
|---|---|---|---|
| 1–3 | Cement mortar | 200 × 200 × 35 | 30 |
| 4–6 | Cement slate plate | 200 × 200 × 7 | 30 |
| 7–9 | Extruded cement plate | 200 × 200 × 15 | 30 |
| 10–11 | Foamed concrete ALC plate | 200 × 200 × 50 | 20 |
| 12–13 | Calcium silicate plate | 200 × 200 × 15 | 20 |
| 14–16 | Steel plate | 200 × 200 × 4 | 30 |
| 17–19 | Aluminum plate | 200 × 200 × 5 | 30 |
| 20–21 | Stainless steel plate (SUS 304) | 200 × 200 × 2 | 20 |

TABLE 3

| Test Piece No. | Name of Composition (1) | Number of Coatings | Thickness of Film (μm) | Hardening Conditions |
|---|---|---|---|---|
| 1 | A | 1 | ca. 45 | Dried at ordinary temperature |
| 2 | C/C | 2 | ca. 80 | 1st: dried at ordinary temperature for 1 hour 2nd: dried at ordinary temperature |
| 3 | B/B | 2 | ca. 40 | 1st: dried at ordinary temperature for 1 hour 2nd: dried at ordinary temperature |
| 4 | B | 1 | ca. 40 | Dried at ordinary temperature |
| 5 | A/G | 2 | ca. 40 | 1st: dried by heating at 100° C. for 5 minutes 2nd: dried by heating at 100° C. for 5 minutes |
| 6 | D | 1 | ca. 50 | Dried by heating at 70° C. for 10 minutes |
| 7 | A/A | 2 | ca. 100 | 1st: dried by heating at 70° C. for 10 minutes 2nd: dried by heating at 70° C. for 10 minutes |
| 8 | F/C | 2 | ca. 110 | 1st: dried by heating at 70° C. for 10 minutes 2nd: dried by heating at 70° C. for 10 minutes |
| 9 | C/C | 2 | ca. 90 | 1st: dried at ordinary temperature for 2 hours 2nd: dried at ordinary temperature |
| 10 | F/F/C | 3 | ca. 280 | 1st–3rd: dried at ordinary temperature for 1 hour |

TABLE 4

| Test Piece No. | Name of Composition (1) | Number of Coatings | Thickness of Film (μm) | Hardening Conditions |
|---|---|---|---|---|
| 11 | F/F/G | 3 | ca. 250 | 1st–3rd: dried at ordinary temperature for 1 hour |
| 12 | C/C | 2 | ca. 80 | 1st: dried by heating at 100° C. for 10 minutes 2nd: dried by heating at 100° C. for 10 minutes |
| 13 | G/G | 2 | ca. 30 | 1st: dried by heating at 100° C. for 10 minutes 2nd: applied to a pre- |

TABLE 4-continued

| Test Piece No. | Name of Composition (1) | Number of Coatings | Thickness of Film (μm) | Hardening Conditions |
|---|---|---|---|---|
| | | | | heated surface, and dried at ordinary temperature |
| 14 | E/B | 2 | ca. 90 | 1st: dried at ordinary temperature for 2 hours<br>2nd: dried at ordinary temperature |
| 15 | E/D | 2 | ca. 80 | 1st: dried by heating at 100° C. for 10 minutes<br>2nd: dried by heating at 180° C. for 5 minutes |
| 16 | E/A/G | 3 | ca. 105 | 1st–3rd: dried by heating at 150° C. for 5 minutes |
| 17 | E/A | 2 | ca. 70 | 1st–2nd: dried by heating at 100° C. for 10 minutes |
| 18 | E/D | 2 | ca. 80 | 1st: dried at ordinary temperature for 2 hours<br>2nd: dried at ordinary temperature |

TABLE 5

| Test Piece No. | Name of Composition (1) | Number of Coatings | Thickness of Film (μm) | Hardening Conditions |
|---|---|---|---|---|
| 19 | E/C | 2 | ca. 100 | 1st: dried by heating at 150° C. for 5 minutes<br>2nd: applied to a pre-heated surface, and dried at ordinary temperature |
| 20 | C | 1 | ca. 50 | Dried at ordinary temperature |
| 21 | A/G | 2 | ca. 70 | 1st: dried by heating at 120° C. for 10 minutes<br>2nd: applied to a pre-heated surface, and dried at ordinary temperature |

The test pieces prepared under the conditions shown in Tables 3 to 5 were kept in a chamber for 7 days, and then, subjected to evaluation tests for the above-mentioned adhesion, hardness, impact resistance, heat resistance, incombustibility, weather resistance (1), weather resistance (2), hot water resistance, boiling water resistance, thermal cycle, salt water spray resistance, alkali resistance, acid resistance, solvent resistance, wear resistance and permeability.

Results of the above-mentioned evaluation tests are shown in Tables 6 and 7.

TABLE 6

| | Test Piece No. | | | | | | | | | | |
|---|---|---|---|---|---|---|---|---|---|---|---|
| | 1 | 2 | 3 | 4 | 5 | 6 | 7 | 8 | 9 | 10 | 11 |
| Adhesion | o | o | o | o | o | o | o | o | o | o | o |
| Hardness | 6H | 8H | 6H | 6H | 8H | 8H | 7H | 7H | 6H | 4H | 4H |
| Impact Resistance | o | o | o | o | o | o | o | o | o | | |
| Heat Resistance | — | — | — | — | — | — | — | — | — | — | — |
| Incombustibility | — | — | — | — | — | — | — | — | — | — | — |
| Weather Resistance (1) | o | — | — | — | o | — | — | — | o | o | — |
| Weather Resistance (2) | — | — | o | o | — | — | — | o | — | — | o |
| Hot Water Resistance | o | o | o | o | o | o | o | o | o | o | o |
| Boiling Water Resistance | o | — | o | — | o | — | o | — | — | — | — |
| Thermal cycle | — | — | — | — | — | — | — | — | — | — | — |
| Salt Water Spray Resistance | — | — | — | — | — | — | — | — | — | — | — |
| Alkali Resistance | o | o | o | o | o | o | o | o | o | o | o |
| Acid Resistance | — | o | — | o | — | o | — | o | — | — | — |
| Solvent Resistance | o | — | — | o | — | — | o | — | — | o | — |
| Wear Resistance | o | o | o | o | o | o | o | o | o | x | x |
| Permeability | 7 | 5 | 6 | 6 | 4 | 7 | 8 | 7 | 5 | 10 | 8 |

TABLE 7

| | Test Piece No. | | | | | | | | | | |
|---|---|---|---|---|---|---|---|---|---|---|---|
| | 12 | 13 | 14 | 15 | 16 | 17 | 18 | 19 | 20 | 21 | |
| Adhesion | o | o | o | o | o | o | o | o | o | o | |
| Hardness | 7H | 8H | 5H | 7H | 8H | 6H | 4H | 7H | 7H | 8H | |
| Impact Resistance | o | o | o | o | o | o | o | o | o | o | |
| Heat Resistance | — | — | — | — | — | — | — | — | o | o | |
| Incombustibility | — | — | o | o | o | — | — | — | o | o | |
| Weather Resistance (1) | o | — | o | — | o | o | — | o | — | o | |
| Weather Resistance (2) | — | o | — | o | o | — | o | o | o | — | |
| Hot Water Resistance | o | o | o | o | o | o | o | o | o | o | |
| Boiling Water Resistance | o | — | o | — | o | — | o | — | o | — | |
| Thermal Cycle | — | — | o | o | o | — | — | — | o | o | |
| Salt Water Spray Resistance | — | — | o | o | o | o | o | o | — | — | |
| Alkali Resistance | o | o | — | — | — | — | — | — | o | o | |
| Acid Resistance | o | — | o | o | o | o | o | o | o | o | |
| Solvent Resistance | — | o | — | o | — | — | o | — | o | — | |
| Wear Resistance | o | o | o | o | o | o | x | o | o | o | |
| Permeability | 8 | 7 | — | — | — | — | — | — | — | — | |

EXAMPLES 8 to 23

Seven kinds of coating compositions (1), A' to G', shown in Table 8 were prepared.

The above-mentioned coating compositions (1) were prepared in the same manner as with the coating compositions (1) used in Examples 1 to 7.

Then, coating compositions (2), H to K, shown in Table 9 were prepared.

Each of the above-mentioned coating compositions (2) was prepared by placing components (a)', further component (c)' and/or other additives if necessary in a mixing tank, and lightly stirring the mixture, followed by stirring at a high speed (13,000 rpm) for 5 minutes.

The components (a)' and (c)' constituting the composition (2) are identical to the components (a) and (c) constituting the composition (1). The components (a)' and (c)' are therefore hereinafter referred to as "components (a) and (c)", respectively.

The respective components given in Tables 8 and 9 are as shown above.

TABLE 8

| Kind of Composition (1) | A' | B' | C' | D' | E' | F' | G' |
|---|---|---|---|---|---|---|---|
| Formulation (parts) | | | | | | | |
| (a)-1 | — | — | 15 | — | — | 25 | — |
| (a)-2 | 27 | 30 | — | 25 | 35 | — | 20 |
| (b)-1 | — | 16 | — | 20 | — | — | — |
| (b)-2 | 15 | 50 | — | — | 23 | — | — |
| (b)-3 | 15 | — | 25 | — | — | 75 | — |
| (b)-4 | — | — | 20 | 25 | — | — | — |
| (b)-5 | 30 | — | — | 20 | 35 | — | — |
| (b)-6 | — | 4 | — | — | 2 | — | — |
| (b)-7 | — | — | 20 | — | 5 | — | — |
| (b)-9 | — | — | — | — | — | — | 80 |
| (c)-1 | 13 | — | 20 | 10 | — | — | — |
| Total (parts) | 100 | 100 | 100 | 100 | 100 | 100 | 100 |
| (d)-1 | 0.5 | — | 0.5 | 0.5 | — | — | — |

TABLE 9

| Kind of Composition (2) | H | I | J | K |
|---|---|---|---|---|
| Formulation (parts) | | | | |
| (a)-1 | — | — | — | 30 |
| (a)-2 | 15 | 20 | 25 | — |
| (c)-1 | 85 | 80 | 75 | 70 |
| Total (parts) | 100 | 100 | 100 | 100 |
| (d)-1 | — | 0.5 | 1.0 | — |

Preparation of Test Pieces for Evaluation

Various substrates shown in Table 10 were coated with the coating compositions thus prepared, followed by hardening to prepare test pieces for evaluation (Nos. 8' to 23', Examples 8 to 23). Of these substrates, steel plates, aluminum plates and stainless steel plates were subjected to alkali degreasing treatment, and the other plates are subjected to cleaning treatment as substrate treatment before coating of the coating compositions. An air spray gun was used for coating of the coating compositions, and an electric oven was used for heating. The number of coatings of the coating compositions and hardening conditions are shown in Tables 11 to 14.

TABLE 10

| Test Piece | Material | Size (mm) | Pieces Prepared |
|---|---|---|---|
| 8'–9' | Cement mortar | 200 × 200 × 35 | 20 |
| 10'–11' | Cement slate plate | 200 × 200 × 7 | 20 |
| 12'–13' | Extruded cement plate | 200 × 200 × 15 | 20 |
| 14'–15' | Foamed concrete ALC plate | 200 × 200 × 50 | 20 |
| 16'–17' | Calcium silicate plate | 200 × 200 × 15 | 20 |
| 18'–19' | Steel plate | 200 × 200 × 4 | 20 |
| 20'–21' | Aluminum plate | 200 × 200 × 5 | 20 |
| 22'–23' | Stainless steel plate (SUS 304) | 200 × 200 × 2 | 20 |

TABLE 11

| Example (Test Piece No.) | Name of Composition (1) | Number of Coatings | Thickness of Film (μm) | Hardening Conditions |
|---|---|---|---|---|
| 8 (8') | A'/H | 2 | ca. 45 | After coating of A', H was immediately applied, and dried at ordinary temperature |
| 9 (9') | C'/J | 2 | ca. 35 | C': dried at ordinary temperature for 1 hour J: dried at ordinary temperature |
| 10 (10') | E'/H | 2 | ca. 30 | E': dried at ordinary temperature for 5 minutes H: dried at ordinary temperature |
| 11 (11') | B'/I | 2 | ca. 40 | After coating of B', I was immediately applied, and dried by heating at 70° C. for 10 minutes |
| 12 (12') | D'/K | 2 | ca. 50 | D': dried by heating at 80° C. for 5 minutes K: applied to a preheated surface, and dried at ordinary temperature |
| 13 (13') | A'/I | 2 | ca. 40 | A': dried at ordinary temperature for 1 hour I: dried at ordinary temperature |
| 14 (14') | F'/K | 2 | ca. 1,000 | F': dried at ordinary temperature for 1 hour K: dried at ordinary temperature |

TABLE 12

| Example (Test Piece No.) | Name of Composition (1) | Number of Coatings | Thickness of Film (μm) | Hardening Conditions |
|---|---|---|---|---|
| 15 (15') | F'/E'/J | 3 | ca. 900 | F': dried at ordinary temperature for 30 minutes E': dried by heating at 80° C. for 30 minutes J: applied to a preheated surface, and dried at ordinary temperature |
| 16 (16') | E'/J | 2 | ca. 40 | After coating of E', J was immediately applied, and dried by heating at 100° C. for 5 minutes |
| 17 | F'/K | 2 | ca. 75 | F': dried at ordinary |

TABLE 12-continued

| Example (Test Piece No.) | Name of Composition (1) | Number of Coatings | Thickness of Film (μm) | Hardening Conditions |
|---|---|---|---|---|
| (17') | | | | temperature for 30 minutes K: dried at ordinary temperature |
| 18 (18') | G'/A'/I | 3 | ca. 105 | G': dried at ordinary temperature for 1 hour A': dried at ordinary temperature for 1 hour I: dried at ordinary temperature |
| 19 (19') | G'/B'/H | 3 | ca. 90 | G': dried by heating at 100° C. for 5 minutes After coating of B', H was immediately applied, and dried by heating at 150° C. for 1 minute |

TABLE 13

| Example (Test Piece No.) | Name of Composition (1) | Number of Coatings | Thickness of Film (μm) | Hardening Conditions |
|---|---|---|---|---|
| 20 (20') | G'/C'/J | 3 | ca. 65 | G': dried by heating at 100° C. for 5 minutes C': dried by heating at 100° C. for 5 minutes J: dried by heating at 100° C. for 5 minutes |
| 21 (21') | G'/E'/H | 3 | ca. 60 | G': dried at ordinary temperature for 30 minutes After coating of E', H was immediately applied, and dried by heating at 100° C. for 20 minute |
| 22 (22') | C'/J | 2 | ca. 30 | After coating of C', J was immediately applied, and dried by heating at 150° C. for 5 minutes |
| 23 (23') | D'/K | 2 | ca. 35 | D': dried at ordinary temperature for 30 minutes K: dried at ordinary temperature |

The test pieces prepared under the conditions shown in Tables 11 to 13 were kept in a chamber for 7 days, and then, subjected to evaluation tests for the above-mentioned adhesion, hardness, impact resistance, heat resistance, incombustibility, weather resistance (1), weather resistance (2), hot water resistance, boiling water resistance, thermal cycle, salt water spray resistance, alkali resistance, acid resistance, solvent resistance, wear resistance, soil resistance (1), soil resistance (2) and permeability.

Results of the above-mentioned evaluation tests are shown in Tables 14 and 15.

TABLE 14

| | Example | | | | | | | |
|---|---|---|---|---|---|---|---|---|
| | 8 | 9 | 10 | 11 | 12 | 13 | 14 | 15 |
| Adhesion | o | o | o | o | o | o | o | o |
| Hardness | 8H | 8H | 7H | 9H | 8H | 7H | 6H | 7H |
| Impact Resistance | o | o | o | o | o | o | o | o |
| Heat Resistance | — | — | — | — | — | — | — | — |
| Incombustibility | — | — | o | — | o | — | o | o |
| Weather Resistance (1) | o | — | — | o | o | — | o | — |
| Weather Resistance (2) | — | — | o | — | — | o | — | o |
| Hot Water Resistance | o | o | o | o | o | o | o | o |
| Boiling Water Resistance | o | — | o | — | o | — | — | — |
| Thermal Cycle | — | — | — | — | — | — | — | — |
| Salt Water Spray Resistance | — | — | — | — | — | — | — | — |
| Alkali Resistance | o | o | o | o | o | o | o | o |
| Acid Resistance | o | o | o | o | o | o | o | o |
| Solvent Resistance | o | — | o | — | o | — | — | — |
| Wear Resistance | o | o | o | o | o | o | o | o |
| Soil Resistance (1) | o | o | o | o | o | o | o | o |
| Soil Resistance (2) | o | o | o | o | o | o | o | o |
| Permeability | 4 | 4 | 2 | 3 | 5 | 4 | 6 | 7 |

TABLE 15

| | Example | | | | | | | |
|---|---|---|---|---|---|---|---|---|
| | 16 | 17 | 18 | 19 | 20 | 21 | 22 | 23 |
| Adhesion | o | o | o | o | o | o | o | o |
| Hardness | 7H | 7H | 9H | 9H | 8H | 8H | 9H | 9H |
| Impact Resistance | o | o | o | o | o | o | o | o |
| Heat Resistance | — | o | o | o | — | — | o | o |
| Incombustibility | o | o | o | o | o | o | o | o |
| Weather Resistance (1) | o | o | — | o | — | o | — | o |
| Weather Resistance (2) | — | — | o | — | o | — | o | — |
| Hot Water Resistance | o | o | o | o | o | o | o | o |
| Boiling Water Resistance | — | — | o | o | o | o | o | o |
| Thermal Cycle | — | — | o | o | o | o | o | o |
| Salt Water Spray Resistance | — | — | o | o | o | o | — | — |
| Alkali Resistance | o | o | — | — | — | — | o | o |
| Acid Resistance | o | o | o | o | o | o | o | o |
| Solvent Resistance | o | — | o | o | o | o | o | o |
| Wear Resistance | o | o | o | o | o | o | o | o |
| Soil Resistance (1) | o | o | o | o | o | o | o | o |
| Soil Resistance (2) | o | o | o | o | o | o | o | o |
| Permeability | 5 | 6 | — | — | — | — | — | — |

We claim:

1. A coating method comprising the sequential steps of:
    applying to a surface of a substrate a first coating composition consisting essentially of 3 to 16 parts by weight on a $SiO_2$ basis of a quaternary ammonium silicate, 15 to 85 parts by weight of an inorganic filler, and 12 to 82 parts by weight of water; hardening the applied composition by drying at 5°–250° C., and
    applying a second coating composition consisting essentially of 2 to 15 parts by weight on an $SiO_2$ basis of a quaternary ammonium silicate and 98 to 85 parts by weight of water to the substrate.

2. The method according to claim 1, in which the substrate is of iron, stainless steel, aluminum, cement, concrete, glass, a ceramic, paper or wood.

3. The method according to claim 1, in which the inorganic filler contains at least one water insoluble filler composed of particles having a mean grain size of from 0.1 to 100 microns or a mean length of from 0.1 to 100 microns and selected from the group consisting of:

silica, alumina, kaolin, zircon, tin oxide, mullite, a zeolite, talc, perlite, carbon, silicon carbide, silicon nitride, and metal powders.

4. The method according to claim 1, in which the drying is conducted at 5° to 30° C. for 1 to 8 hours or at 30° to 250° C. for 5 to 40 minutes.

* * * * *